United States Patent
Sarkis et al.

(10) Patent No.: US 11,601,910 B2
(45) Date of Patent: Mar. 7, 2023

(54) SIDELINK CONTROL INFORMATION (SCI)-TRIGGERED SIDELINK POSITIONING

(71) Applicant: QUALCOMM Incorporated, San Diego, CA (US)

(72) Inventors: Gabi Sarkis, San Diego, CA (US); Dan Vassilovski, Del Mar, CA (US); Shailesh Patil, San Diego, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/369,882

(22) Filed: Jul. 7, 2021

(65) Prior Publication Data

US 2023/0011471 A1    Jan. 12, 2023

(51) Int. Cl.
*H04W 4/00* (2018.01)
*H04W 64/00* (2009.01)
*H04W 92/18* (2009.01)

(52) U.S. Cl.
CPC ............ *H04W 64/00* (2013.01); *H04W 92/18* (2013.01)

(58) Field of Classification Search
None
See application file for complete search history.

(56) References Cited

FOREIGN PATENT DOCUMENTS

| WO | WO-2021064135 A1 | * | 4/2021 |
|---|---|---|---|
| WO | 2021101182 A1 | | 5/2021 |
| WO | 2021112610 A1 | | 6/2021 |
| WO | 2021188208 A1 | | 9/2021 |
| WO | 2021225748 A1 | | 11/2021 |

OTHER PUBLICATIONS

International Search Report and Written Opinion—PCT/US2022/034741—ISA/EPO—dated Oct. 4, 2022.

* cited by examiner

*Primary Examiner* — Suhail Khan
(74) *Attorney, Agent, or Firm* — Loza & Loza LLP

(57) ABSTRACT

Aspects relate to sidelink positioning using second stage sidelink control information (SCI-2). A first wireless communication device (e.g., first UE) may transmit SCI-2 including a sidelink positioning establishment message to establish a sidelink positioning session with at least a second wireless communication device (e.g., a second UE). Each of the first UE and second UE may then transmit positioning reference signals (PRSs) and generate and transmit sidelink positioning information based on the PRSs during the sidelink positioning session. The sidelink positioning information may further be transmitted via SCI-2.

30 Claims, 11 Drawing Sheets

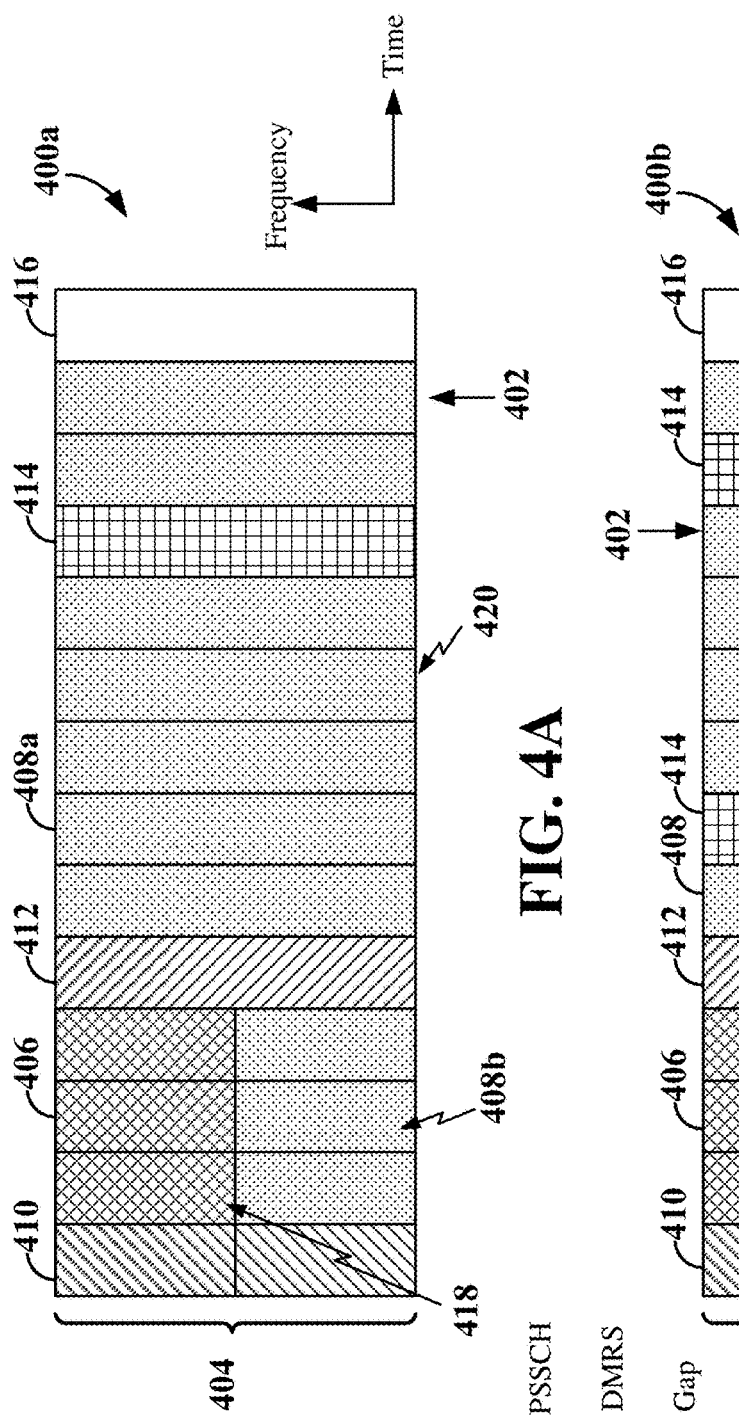
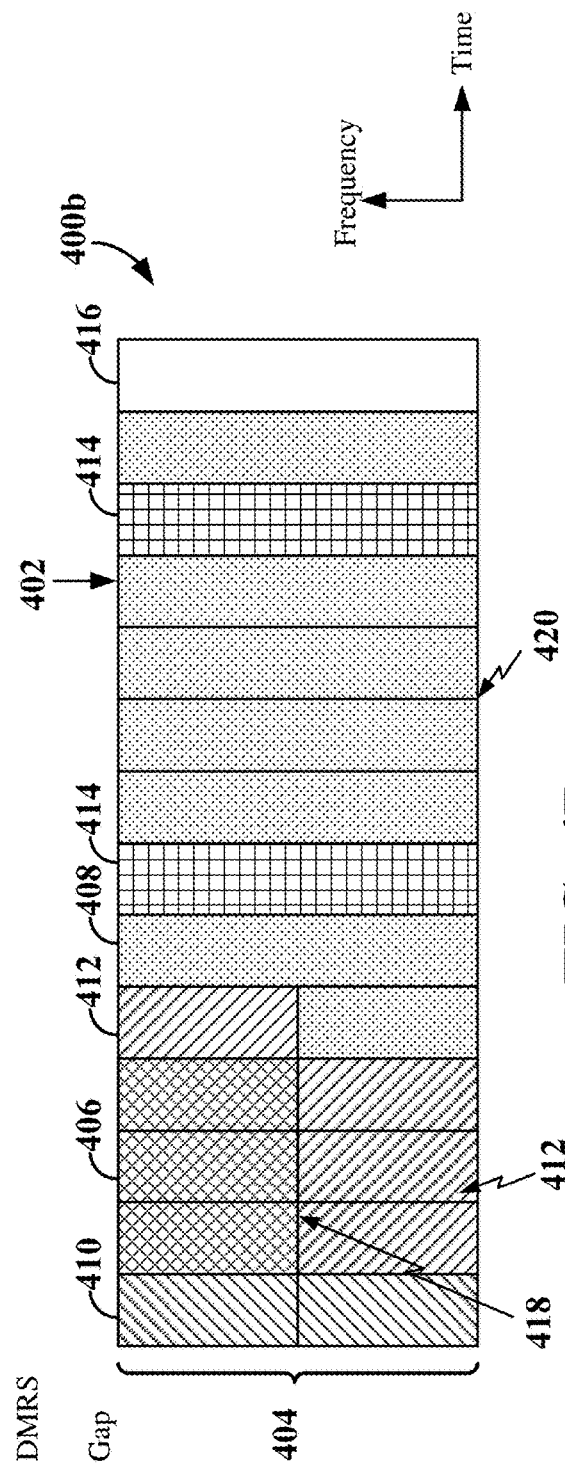
FIG. 4A
FIG. 4B

SIDELINK CONTROL INFORMATION (SCI)-TRIGGERED SIDELINK POSITIONING

TECHNICAL FIELD

The technology discussed below relates generally to wireless communication networks, and more particularly, to techniques for sidelink positioning between user equipment (UE).

BACKGROUND

Wireless communication between devices may be facilitated by various network configurations. In one configuration, a cellular network may enable user equipment (UEs) to communicate with one another through signaling with a nearby base station or cell. Another wireless communication network configuration is a device to device (D2D) network in which UEs may signal one another directly, rather than via an intermediary base station or cell. For example, D2D communication networks may utilize sidelink signaling to facilitate the direct communication between UEs over a proximity service (ProSe) PC5 interface. In some sidelink network configurations, UEs may further communicate in a cellular network, generally under the control of a base station. Thus, the UEs may be configured for uplink and downlink signaling via a base station and further for sidelink signaling directly between the UEs without transmissions passing through the base station.

Positioning of UEs within a sidelink communication network may be facilitated through communication with a global navigation satellite system (GNSS). For example, a GNSS receiver within a UE may receive signals from multiple GNSS satellites and estimate the location of the UE based on the received signals. Sidelink UEs may further utilize range-based positioning to estimate their location. For example, UEs may exchange positioning reference signals (PRSs) over sidelinks to determine the relative distance between the UEs and/or the absolute position (e.g., geographical coordinates) of the UEs.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a first wireless communication device in a wireless communication network is disclosed. The first wireless communication device includes a transceiver, a memory, and a processor coupled to the transceiver and the memory. The processor and the memory can be configured to transmit second stage sidelink control information including a sidelink positioning session establishment message via the transceiver to establish a sidelink positioning session with at least a second wireless communication device. The processor and the memory can further be configured to communicate one or more sidelink positioning reference signals with at least the second wireless communication device during the sidelink positioning session via the transceiver, and receive sidelink positioning information based on the one or more sidelink positioning reference signals from at least the second wireless communication device via the transceiver.

Another example provides a method for sidelink positioning at a first wireless communication device in a wireless communication network. The method can include transmitting second stage sidelink control information including a sidelink positioning session establishment message to establish a sidelink positioning session with at least a second wireless communication device. The method can further include communicating one or more sidelink positioning reference signals with at least the second wireless communication device during the sidelink positioning session, and receiving sidelink positioning information based on the one or more sidelink positioning reference signals from at least the second wireless communication device.

Another example provides a first wireless communication device in a wireless communication network. The first wireless communication device can include means for transmitting second stage sidelink control information including a sidelink positioning session establishment message to establish a sidelink positioning session with at least a second wireless communication device. The first wireless communication device can further include means for communicating one or more sidelink positioning reference signals with at least the second wireless communication device during the sidelink positioning session, and means for receiving sidelink positioning information based on the one or more sidelink positioning reference signals from at least the second wireless communication device.

Another example provides a first wireless communication device in a wireless communication network. The first wireless communication device includes a transceiver, a memory, and a processor coupled to the transceiver and the memory. The processor and the memory can be configured to receive second stage sidelink control information including a sidelink positioning session establishment message via the transceiver to establish a sidelink positioning session with at least a second wireless communication device. The processor and the memory can further be configured to communicate one or more sidelink positioning reference signals with at least the second wireless communication device during the sidelink positioning session via the transceiver, and transmit sidelink positioning information based on the one or more sidelink positioning reference signals to at least the second wireless communication device via the transceiver.

Another example provides a method for sidelink positioning at a first wireless communication device in a wireless communication network. The method can include receiving second stage sidelink control information comprising a sidelink positioning session establishment message to establish a sidelink positioning session with at least a second wireless communication device. The method can further include communicating one or more sidelink positioning reference signals with at least the second wireless communication device during the sidelink positioning session, and transmitting sidelink positioning information based on the one or more sidelink positioning reference signals to at least the second wireless communication device.

Another example provides a first wireless communication device in a wireless communication network. The first wireless communication device can include means for receiving second stage sidelink control information comprising a sidelink positioning session establishment message to establish a sidelink positioning session with at least a second wireless communication device. The first wireless communication device can further include means for communicating one or more sidelink positioning reference signals with at least the second wireless communication device during the sidelink positioning session, and means for transmitting sidelink positioning information based on the one or more sidelink positioning reference signals to at least the second wireless communication device.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

BRIEF DESCRIPTION OF THE DRAWINGS

FIGS. 4A and 4B are diagrams illustrating examples of sidelink slot structures according to some aspects.

DETAILED DESCRIPTION

Figure 1:
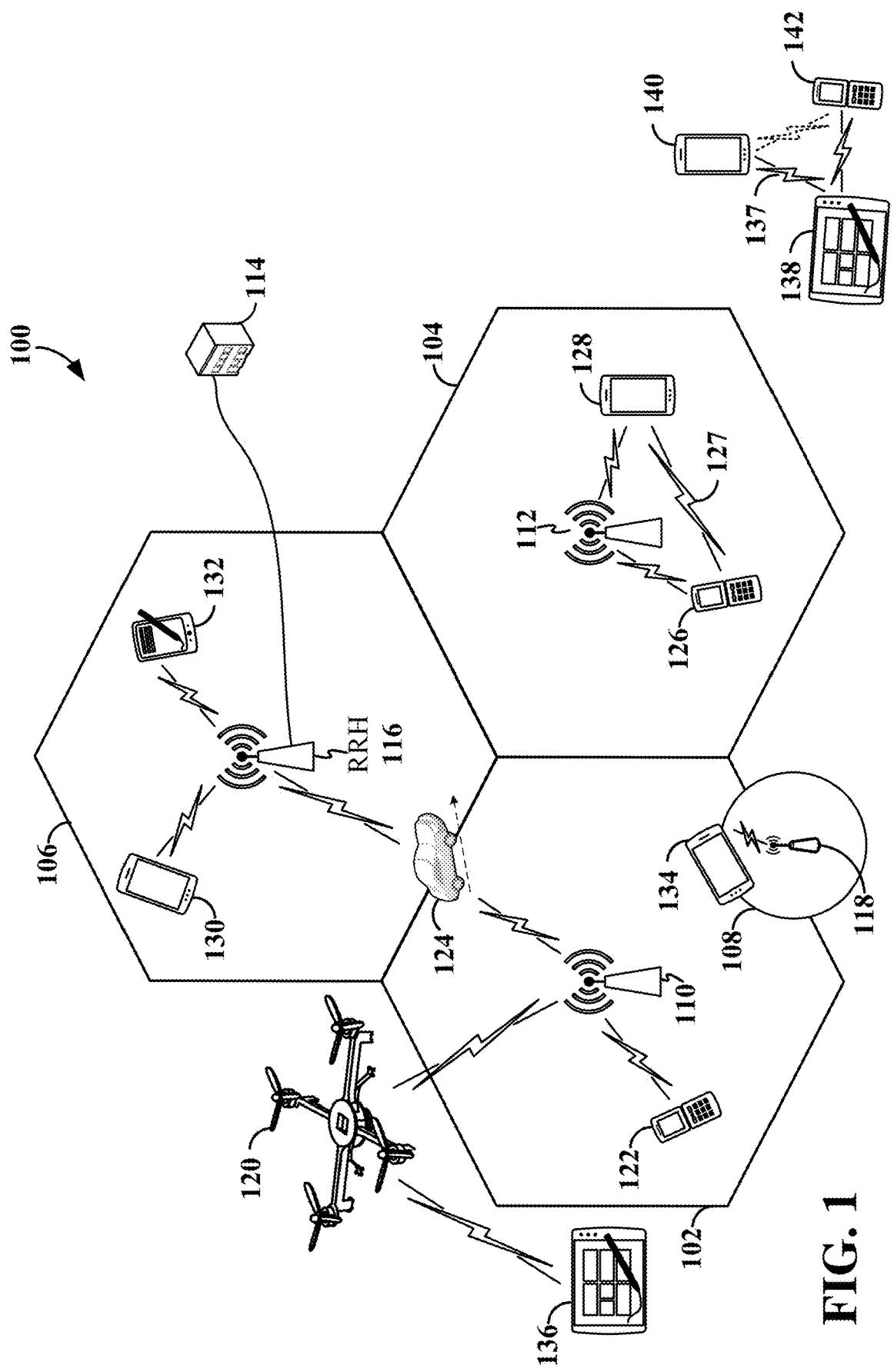
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to sidelink positioning using second stage sidelink control information (SCI-2). A first wireless communication device (e.g., first UE) may transmit SCI-2 including a sidelink positioning establishment message to establish a sidelink positioning session with at least a second wireless communication device (e.g., a second UE). Each of the first UE and second UE may then transmit positioning reference signals (PRSs) during the sidelink positioning session. In addition, each of the first UE and second UE may generate and transmit sidelink positioning information based on the PRSs during the sidelink positioning session. The sidelink positioning information may further be transmitted via SCI-2.

Each of the SCI-2 for the sidelink positioning establishment message and sidelink positioning information may include, for example, one or more destination identifiers (IDs) associated with one or more participating UEs for the sidelink positioning session. For example, the destination ID(s) may include one or more destination IDs, each associated with one of the participating UEs, for unicast transmission of the SCI-2, a group ID for a group of participating UEs for groupcast transmission of the SCI-2, or a broadcast ID for broadcast transmission of the SCI-2. The sidelink positioning establishment message may further include location information associated with the first wireless communication device, a range associated with the location information defining an area for the sidelink positioning session, a time duration of the sidelink positioning session, a periodicity of the sidelink positioning session, and/or resource information for the one or more PRSs. The sidelink positioning information may include a time measurement, an angle measurement, a distance measurement, a direction indication, a location of the transmitting UE, a velocity vector of the transmitting UE, or an acceleration vector of the transmitting UE. In some examples, the sidelink positioning information may further include an additional sidelink positioning establishment message to establish an additional sidelink positioning session.

In some examples, first stage SCI (SCI-1) associated with the SCI-2 including the sidelink positioning session establishment message or the sidelink positioning information may further include an indication that the SCI-2 includes the sidelink positioning session establishment message or the sidelink positioning information. For example, the indication may include at least one of a positioning indicator bit or a dedicated SCI-2 format.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smart-book, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
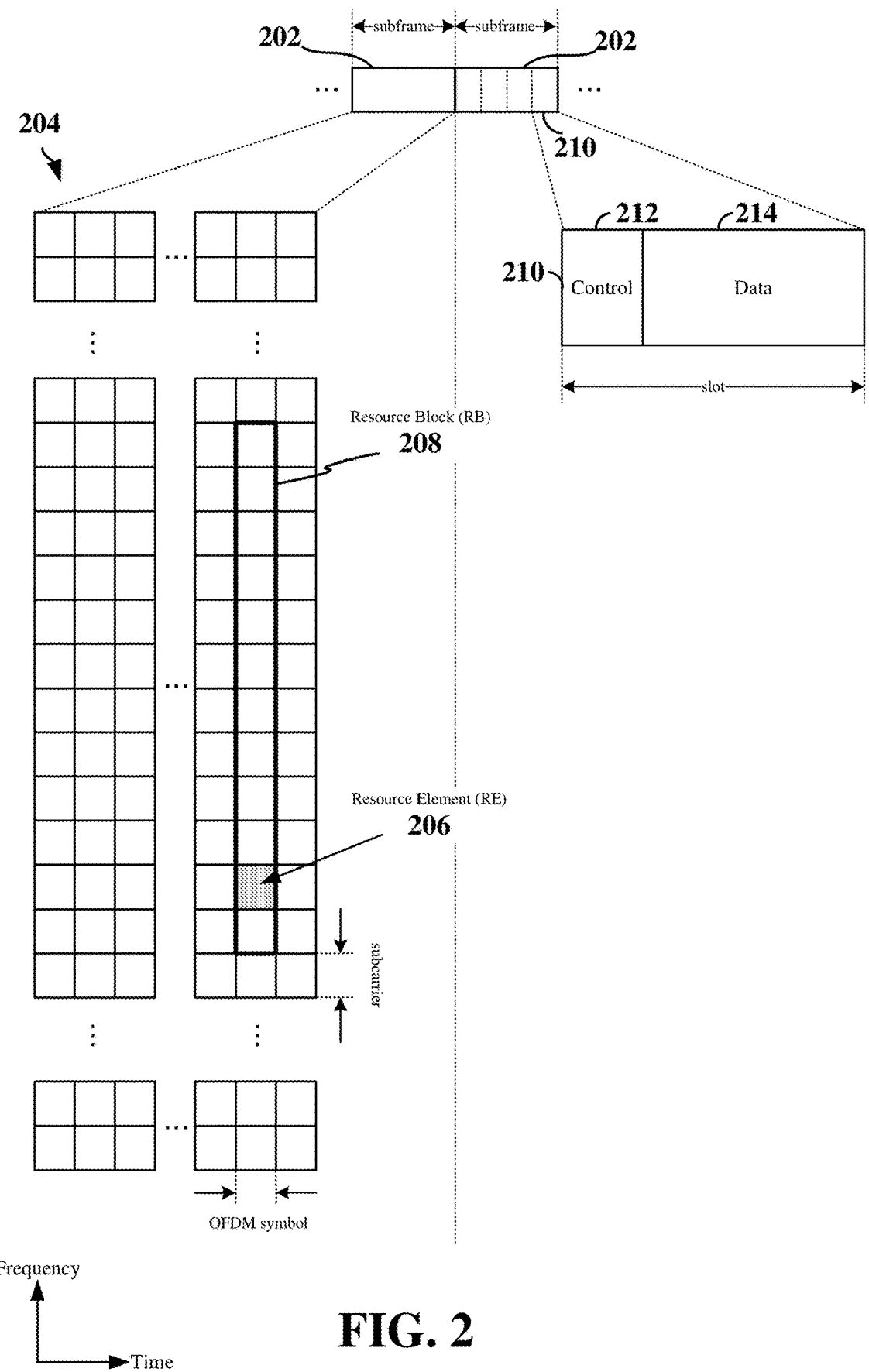
FIG. 2 is a diagram illustrating an example of a frame structure for use in a wireless communication network according to some aspects.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS);

a channel state information (CSI) reference signal (CSI-RS); and a synchronization signal block (SSB). SSBs may be broadcast at regular intervals based on a periodicity (e.g., 5, 10, 20, 20, 80, or 120 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
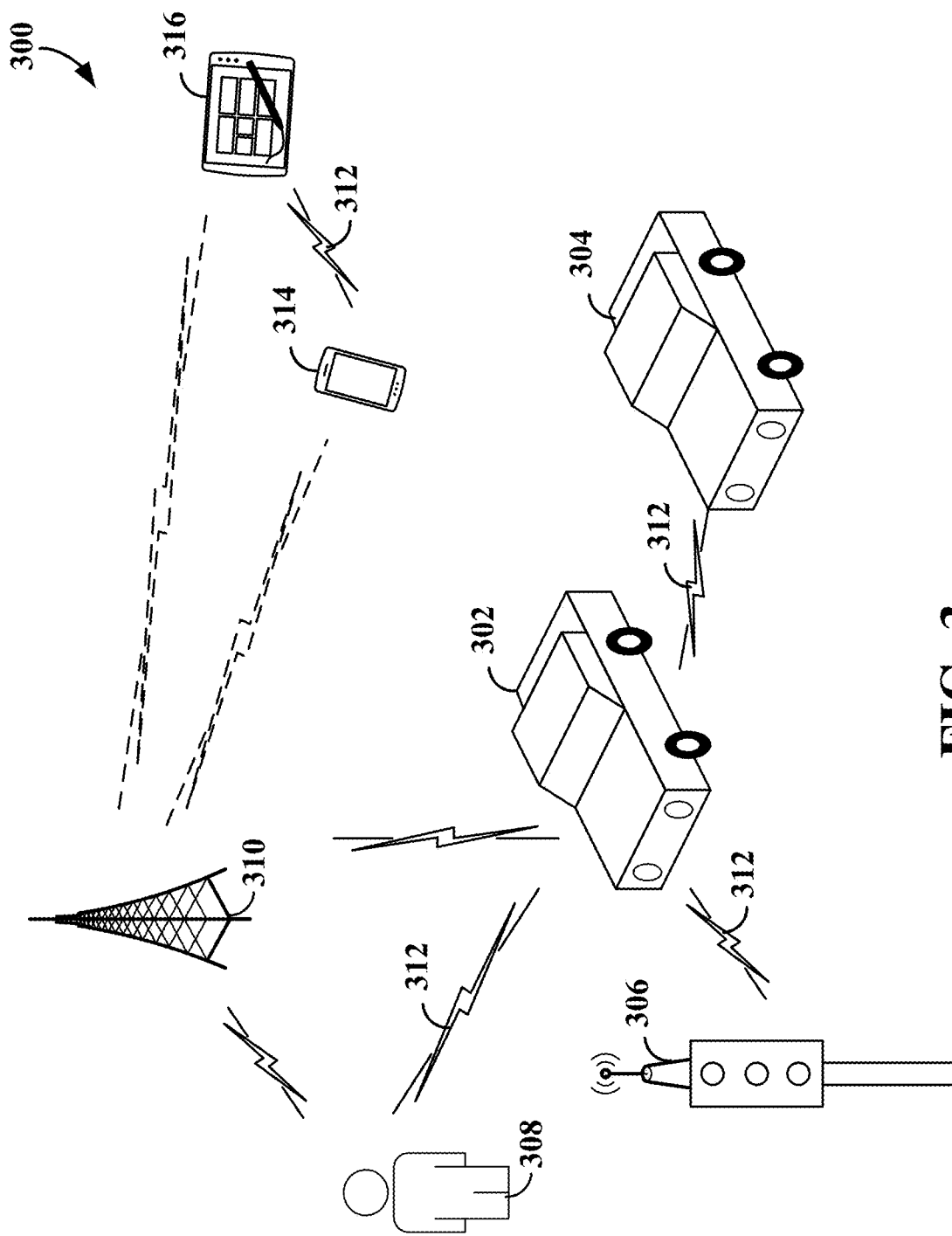
FIG. 3 is a diagram illustrating an example of a wireless communication network employing sidelink communication according to some aspects.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/ or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. For example, the base station 310 may schedule the sidelink communication via DCI 3_0. In some examples, the base station 310 may schedule the PSCCH/PSSCH within uplink resources indicated in DCI 3_0. The base station 310 may further activate preconfigured sidelink grants (e.g., configured grants) for sidelink communication among the sidelink devices. In some examples, the base station 310 may activate a configured grant (CG) via RRC signaling. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). For example, SCI-1 may include a physical sidelink shared channel (PSSCH) resource assignment and a resource reservation period (if enabled). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may be transmitted on the PSSCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK (e.g., for groupcast option 1 supporting NACK-only signaling). SCI-2 may include other information that is useful for establishing and decoding a PSSCH resource.

FIGS. 4A and 4B are diagrams illustrating examples of sidelink slot structures according to some aspects. The sidelink slot structures may be utilized, for example, in a V2X or other D2D network implementing sidelink. In the examples shown in FIGS. 4A and 4B, time is in the horizontal direction with units of symbols 402 (e.g., OFDM symbols); and frequency is in the vertical direction. Here, a carrier bandwidth 404 allocated for sidelink wireless communication is illustrated along the frequency axis. The carrier bandwidth 404 may include a plurality of sub-channels, where each sub-channel may include a configurable number of PRBs (e.g., 10, 14, 20, 24, 40, 44, or 100 PRBs).

Each of FIGS. 4A and 4B illustrate an example of a respective slot 400a or 400b including fourteen symbols 402 that may be used for sidelink communication. However, it should be understood that sidelink communication can be configured to occupy fewer than fourteen symbols in a slot 400a or 400b, and the disclosure is not limited to any particular number of symbols 402. Each sidelink slot 400a and 400b includes a physical sidelink control channel (PSCCH) 406 occupying a control region 418 of the slot 400a and 400b and a physical sidelink shared channel (PSSCH) 408 occupying a data region 420 of the slot 400a and 400b. The PSCCH 406 and PSSCH 408 are each transmitted on one or more symbols 402 of the slot 400a. The PSCCH 406 includes, for example, SCI-1 that schedules transmission of data traffic on time-frequency resources of the corresponding PSSCH 408. As shown in FIGS. 4A and 4B, the PSCCH 406 and corresponding PSSCH 408 are transmitted in the same slot 400a and 400b. In other examples, the PSCCH 406 may schedule a PSSCH in a subsequent slot.

In some examples, the PSCCH 406 duration is configured to be two or three symbols. In addition, the PSCCH 406 may be configured to span a configurable number of PRBs, limited to a single sub-channel. The PSSCH resource size may be fixed for a resource pool (e.g., 10% to 100% of one sub-channel in the first two or three symbols). For example, the PSCCH 406 may occupy 10, 12, 15, 20, or 25 RBs of a single sub-channel. A DMRS may further be present in every PSCCH symbol. In some examples, the DMRS may be placed on every fourth RE of the PSCCH 406. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs. In each of the examples shown in FIGS. 4A and 4B, the starting symbol for the PSCCH 406 is the second symbol of the corresponding slot 400a or 400b and the PSCCH 406 spans three symbols 402.

The PSSCH 408 may be time-division multiplexed (TDMed) with the PSCCH 406 and/or frequency-division multiplexed (FDMed) with the PSCCH 406. In the example shown in FIG. 4A, the PSSCH 408 includes a first portion 408a that is TDMed with the PSCCH 406 and a second portion 408b that is FDMed with the PSCCH 406. In the example shown in FIG. 4B, the PSSCH 408 is TDMed with the PSCCH 406.

One and two layer transmissions of the PSSCH 408 may be supported with various modulation orders (e.g., QPSK, 16-QAM, 64-QAM and 256-QAM). In addition, the PSSCH 408 may include DMRSs 414 configured in a two, three, or four symbol DMRS pattern. For example, slot 400a shown in FIG. 4A illustrates a two symbol DMRS pattern, while slot 400b shown in FIG. 4B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 408 symbols in the slot 400a or 400b. In addition, a gap symbol 416 is present after the PSSCH 408 in each slot 400a and 400b.

Each slot 400a and 400b further includes SCI-2 412 mapped to contiguous RBs in the PSSCH 408 starting from the first symbol containing a PSSCH DMRS. In the example shown in FIG. 4A, the first symbol containing a PSSCH DMRS is the fifth symbol occurring immediately after the last symbol carrying the PSCCH 406. Therefore, the SCI-2 412 is mapped to RBs within the fifth symbol. In the example shown in FIG. 4B, the first symbol containing a PSSCH DMRS is the second symbol, which also includes the PSCCH 406. In addition, the SCI-2/PSSCH DMRS 412 are shown spanning symbols two through five. As a result, the SCI-2/PSSCH DMRS 412 may be FDMed with the PSCCH 406 in symbols two through four and TDMed with the PSCCH 406 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 406 may be blind decoded at the receiving wireless communication device. However, since the format, starting location, and number of REs of the SCI-2 412 may be derived from the SCI-1, blind decoding of SCI-2 is not needed at the receiver (receiving UE).

In each of FIGS. 4A and 4B, the second symbol of each slot 400a and 400b is copied onto (repeated on) a first symbol 410 thereof for automatic gain control (AGC) settling. For example, in FIG. 4A, the second symbol containing the PSCCH 406 FDMed with the PSSCH 408b may be transmitted on both the first symbol and the second symbol. In the example shown in FIG. 4B, the second symbol containing the PSCCH 406 FDMed with the SCI-2/PSSCH DMRS 412 may be transmitted on both the first symbol and the second symbol.

Within a sidelink communication network, such as a V2X network, positioning of UEs may enhance or support various features, such as navigation, autonomous driving, and cooperative safety. Positioning of UEs may be accomplished, for example, using a global navigation satellite system (GNSS) receiver within the UE and/or via sidelink-based ranging (positioning) between UEs. For example, UEs may exchange positioning reference signals (PRSs) over sidelinks to determine the relative distance between the UEs and/or the absolute position (e.g., geographical coordinates) of the UEs. Sidelink-based positioning may enhance the range and position accuracy of GNSS-based positioning or may be utilized in situations where GNSS is degraded or unavailable.

In some examples, sidelink-based positioning may involve a three-way handshake for session establishment, followed by the exchange of PRSs and concluded with the exchange of positioning information obtained based on the PRSs that is indicative of the relative and/or absolute position of one or more of the UEs. A sidelink positioning session may be triggered by a UE transmitting a request to establish the sidelink positioning session to one or more other UEs in the vicinity of the transmitting UE. In one example, the request can be signaled at the application layer, enabling a radio access technology (RAT)-independent technique for session establishment. However, session establishment via application-layer signaling may suffer from increased latency and increased over-the-air (OTA) messaging as compared to lower-layer (e.g., physical (PHY) layer/ Medium Access Control (MAC) layer) signaling.

Therefore, various aspects of the disclosure relate to techniques for triggering a sidelink positioning session using PHY layer signaling. For example, a sidelink positioning session establishment message for establishing (triggering) a sidelink positioning session may be transmitted via SCI-2. Using PHY-layer signaling results in reduced session establishment latency and reduced OTA messaging, thereby reducing congestion and UE power consumption.

Figure 5:
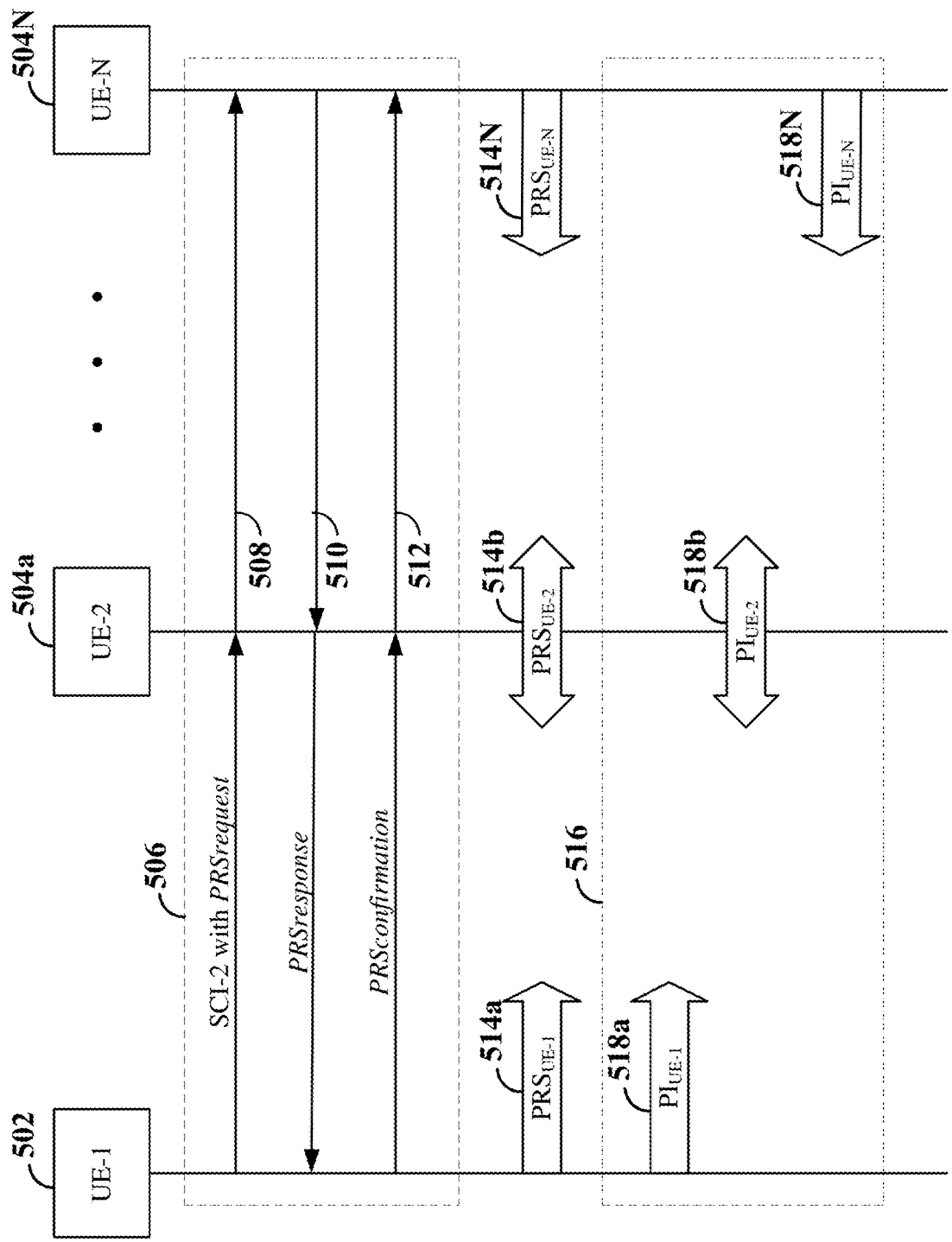
FIG. 5 is a signaling diagram illustrating exemplary signaling for sidelink positioning according to some aspects.

FIG. 5 is a signaling diagram illustrating exemplary signaling between wireless communication devices 502 and 504a . . . 504N for sidelink positioning according to some aspects. Each of the wireless communication devices 502 and 504a . . . 504N may be any of the UEs, sidelink (e.g., V2X, D2D, etc.) devices, or other scheduled entities shown in FIGS. 1 and/or 3.

At 506, a sidelink positioning session may be established using a three-way messaging handshake technique. For example, at 508, a first (initiating) UE 502 (e.g., UE-1) may transmit SCI-2 including a sidelink positioning session establishment message (PRSrequest) to one or more second (target) UEs (e.g., UE-2 504*a* . . . UE-N 504N). The SCI-2 may be unicast to a single target UE (e.g., UE-2 504*a*) or multiple UEs (e.g., UEs 504*a* . . . 504N) or groupcast or broadcast to multiple UEs (e.g., UEs 504*a* . . . 504N). In some examples, the SCI-2 may be transmitted over a portion of the resources allocated to a PSSCH (e.g., as shown in FIGS. 4A and 4B). In this example, the remaining resources allocated to the PSSCH that are not used by the SCI-2 may be unused (e.g., no PSSCH data may be transmitted on the remaining resources). In other examples, the SCI-2 may be transmitted within all of the resources allocated to the PSSCH. For example, the SCI-1 may include a PSSCH resource assignment that is allocated only to SCI-2.

In some examples, the SCI-2 may include an SCI-2 format for sidelink positioning establishment. In addition, the SCI-1 may further indicate that the SCI-2 format is the SCI-2 sidelink positioning establishment format. For example, the SCI-2 format included in the SCI-1 may be a dedicated SCI-2 sidelink positioning establishment format. As another example, the SCI-1 may include a sidelink positioning indicator (e.g., a single bit, which may be, for example, one of the reserved bits in SCI-1) to indicate that the SCI-2 format is the sidelink positioning establishment format. In this example, a receiving UE (e.g., target UE 504*a* . . . 504N) may ignore the SCI-2 format included in the SCI-1 and instead process the SCI-2 based on the SCI-2 sidelink positioning establishment format.

In response to receiving the sidelink positioning establishment message, at 510, each of the target UEs (e.g., UE-2 504*a* . . . UE-N 504N) may transmit a sidelink positioning session response message (PRSresponse) to the initiating UE-1 502 to join the sidelink positioning session. Then, at 512, the initiating UE-1 502 may transmit a sidelink positioning session confirmation message to the target UEs 504*a* . . . 504N to confirm the establishment of the sidelink positioning session.

At 514, each of the initiating UE 502 and target UEs 504*a* . . . 504N may transmit a respective PRS. For example, at 514*a*, UE-1 502 may transmit a PRS (PRS$_{UE-1}$), and at 514*b* . . . 514N, each of the target UEs UE-2 504*a* . . . UE-N 504N may transmit a respective PRS (PRS$_{UE-2}$ . . . PRS$_{UE-N}$). The PRSs may be transmitted, for example, in accordance with PRS resources indicated in the sidelink positioning session establishment message. In some examples, the PRSs may be wideband PRSs transmitted across a particular frequency band or sub-band.

At 516, each of UE-1 502 and UE-2 504*a* . . . UE-N 504*b* may exchange positioning information (PI) obtained based on the PRSs. For example, at 518*a*, UE-1 502 may transmit positioning information (PI$_{UE-1}$) 518 obtained by UE-1 based on the received PRSs from the target UEs 504*a* . . . 504N. Similarly, at 518*b* . . . 518N, each of UE-2 504*a* . . . UE-N 504N may transmit respective PI (e.g., PI$_{UE-2}$ . . . PI$_{UE-N}$) to the initiating UE 502 and each other UE (e.g., UE-2 504*a* . . . 504N) that joined the sidelink positioning session. In some examples, the PI (e.g., PI$_{UE-1}$ . . . PI$_{UE-N}$) may also be transmitted within respective SCI-2 by each of the UEs 502 and 504*a* . . . 504N.

For example, UE-2 504*a* may calculate an inter-UE round-trip-time (RTT) between UE-1 502 and UE-2 504*a* based on the transmit and receive times of PRS$_{UE-1}$. The UE-2 504*a* may further calculate the RTT between UE-2 504*a* and each of the other participating UEs (e.g., UE-N 504N) based on the transmit and receive times of the corresponding respective PRSs (e.g., PRS$_{UE-N}$). The UE-2 504*a* may then include the RTT calculated for UE-1 502 and all other UEs (e.g., UE-N 504N) in the PI$_{UE-2}$ and transmit the PI$_{UE-2}$ to all participating UEs (e.g., UE-1 502 . . . UE-N 504N). The UE-2 504*a* may further include a location (e.g., geographical coordinates) of UE-2 504*a* in PI$_{UE-2}$, if known.

Based on the PI$_{UE-2}$ received from UE-2 504*a*, UE-1 502 may discern its relative position or absolute position (e.g., geographical coordinates). In examples in which UE-1 502 has zero or inaccurate knowledge of its position, the PI$_{UE-2}$ may be utilized by UE-1 502 to yield an inter-UE range between UE-1 502 and UE-2 504*a*. In examples in which UE-1 502 has accurate knowledge of its position (e.g., based on a GNSS-based positioning or receipt of multiple PI (e.g., PI$_{UE-2}$ . . . PI$_{UE-N}$) from multiple UEs), the PI$_{UE-2}$ (e.g., together with other PI received during the sidelink positioning session) may be utilized by UE-1 502 to yield an absolute position of UE-1 502. Similarly, each target UE 504*a* . . . 504N may further utilize each PI (e.g., PI$_{UE-1}$ . . . PI$_{UE-N}$) received during the sidelink positioning session to discern their relative and/or absolute position.

Figure 6:
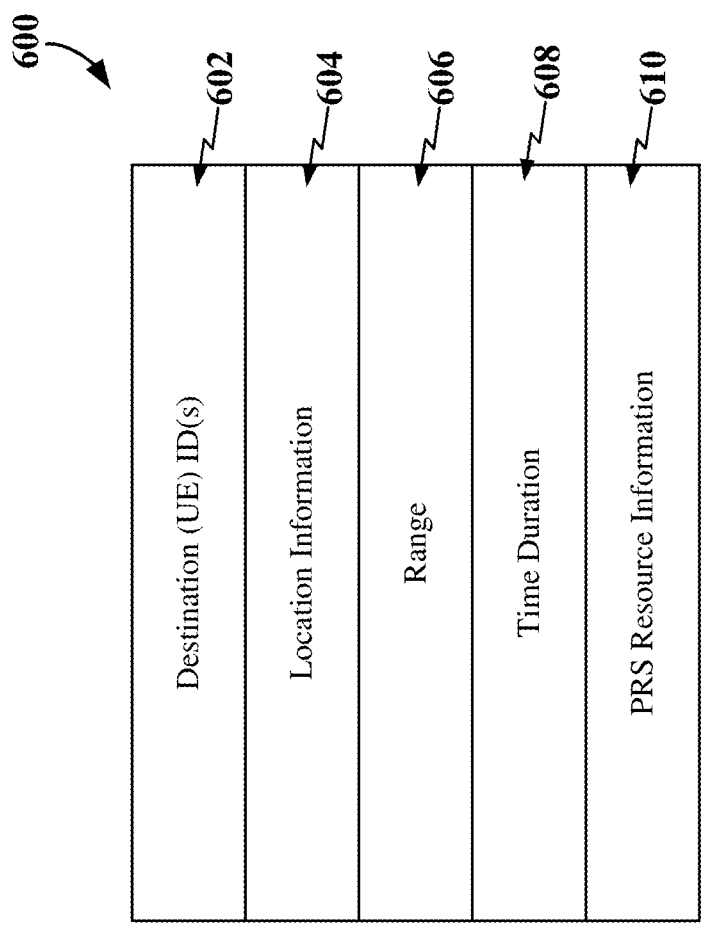
FIG. 6 is a diagram illustrating an example of second stage sidelink control information (SCI-2) for initiating sidelink positioning according to some aspects.

FIG. 6 is a diagram illustrating an example of second stage sidelink control information (SCI-2) 600 for initiating sidelink positioning according to some aspects. The sidelink positioning session establishment SCI-2 600 may have a dedicated SCI-2 format associated therewith that may be included in SCI-1 or may be a modified SCI-2 format that may be indicated via, for example, a positioning indicator in SCI-1. The SCI-2 600 includes a plurality of fields. For example, the SCI-2 600 may include one or more destination (UE) identifiers (IDs) 602 that indicate the target UEs for the sidelink positioning session. For example, the destination ID(s) 602 may include a single destination ID associated with a single other participating UE (e.g., target UE) for unicast SCI-2, a plurality of destination IDs (e.g., destination Layer 2 IDs) for unicast SCI-2, each associated with one of a plurality of participating UEs (e.g., target UEs), a group ID (e.g., group destination Layer 2 ID) identifying a group of participating UEs for groupcast SCI-2, or a broadcast ID (e.g., broadcast destination Layer 2 ID) for broadcast SCI-2.

The SCI-2 600 may further include location information 604 associated with the transmitting (initiating) UE. The location information 604 may include, for example, a zone identifier (ID) identifying a zone within which the initiating UE is located. The location information 604 may further include a zone size of the zone within which the initiating UE is located. For example, the zone ID may indicate a particular geographic zone center location (e.g., coordinates) and the zone size may indicate a radius around the zone center location defining the zone. Thus, the zone size may indicate an area within which the initiating UE is located. In some examples, the zone size may be different than a zone size configured for groupcast option 1 in the resource pool. In other examples, the location information 604 may include other information indicating the location of the initiating UE. For example, the location information 604 may include a unique combination of three words (e.g., a three words address) indicating a precise location of the initiating UE.

The SCI-2 600 may further include a range 606 associated with the location information 604 that identifies an area for the sidelink positioning session. For example, the range 606 may indicate a radial distance from the zone center or other location indication of the initiating UE defining the sidelink positioning session area. The range 606 may thus limit the participating UEs to those within the sidelink positioning session area defined by the location information 604 and range 606.

The SCI-2 600 may further include a time duration 608 of the sidelink positioning session. The time duration 608 may be, for example, in units of slots or time (e.g., ms). In some examples, the time duration 608 may be configured via, for example, RRC signaling instead of being included in the SCI-2 600. In some examples, a participating UE receiving the SCI-2 600 may initiate a timer with the time duration 608 upon receiving the SCI-2 600. In some examples, the time duration 608 may further include a periodicity of the sidelink positioning session. Thus, the time duration 608 may indicate a respective start time and end time of each sidelink positioning session based on the duration of time (e.g., in slots or ms) of a sidelink positioning session and the periodicity of sidelink positioning sessions.

The SCI-2 600 may further include PRS resource information 610 indicating resources allocated for the transmission of PRSs during the sidelink positioning session. For example, the PRS resource information 610 may indicate a frequency band or sub-band on which the PRSs are transmitted.

Figure 7:
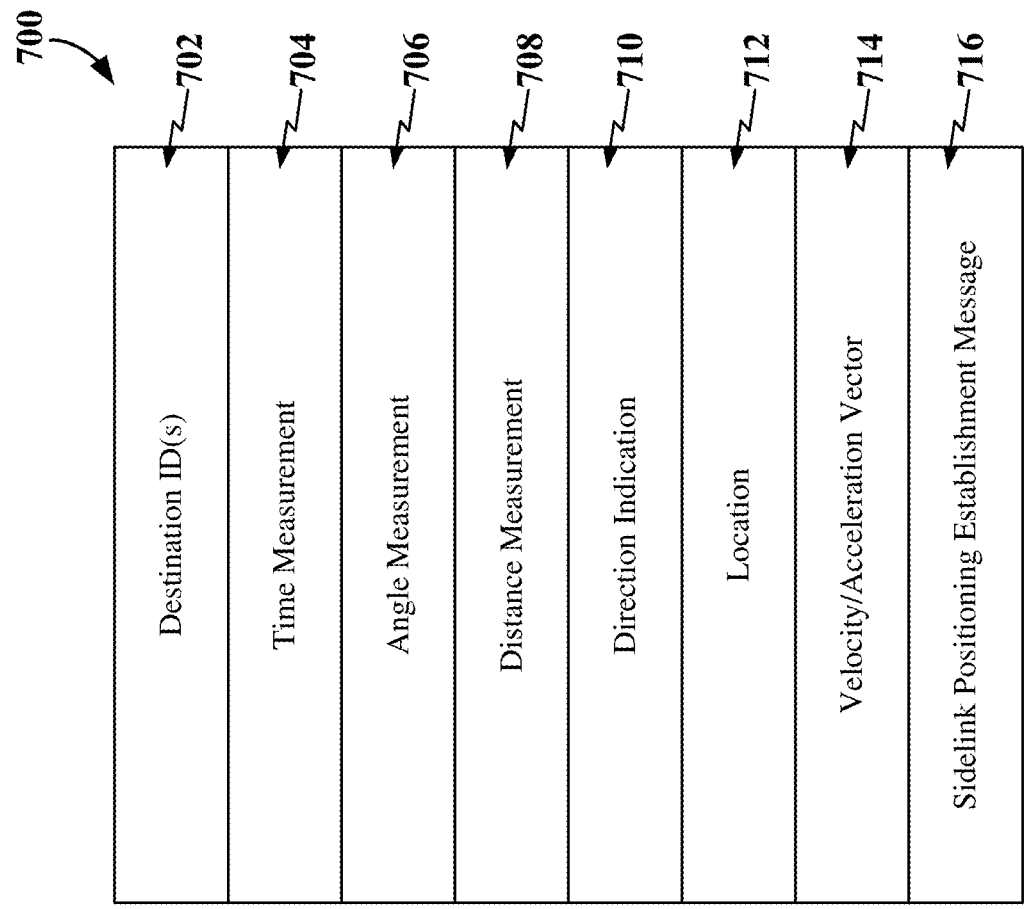
FIG. 7 is a diagram illustrating an example of SCI-2 for reporting sidelink positioning information according to some aspects.

FIG. 7 is a diagram illustrating an example of SCI-2 for reporting sidelink positioning information (PI) according to some aspects. The sidelink PI reporting SCI-2 700 may have a dedicated SCI-2 format associated therewith that may be included in SCI-1 or may be a modified SCI-2 format that may be indicated via, for example, a positioning indicator in SCI-1. The SCI-2 700 includes a plurality of fields. For example, the SCI-2 700 may include one or more destination (UE) identifiers (IDs) 702 that indicate the participating UEs that joined the sidelink positioning session. For example, the destination ID(s) 702 may include a single destination ID associated with a single other participating UE for unicast SCI-2, a plurality of destination IDs (e.g., destination Layer 2 IDs) for unicast SCI-2, each associated with one of a plurality of participating UEs, a group ID (e.g., group destination Layer 2 ID) identifying a group of participating UEs for groupcast SCI-2, or a broadcast ID (e.g., broadcast destination Layer 2 ID) for broadcast SCI-2.

The SCI-2 700 may further include one or more of a time measurement 704, an angle measurement 706, a distance measurement 708, or a direction indication 710. The time measurement 704 may correspond, for example, to an inter-UE RTT measured based on the transmit and receive times of a received PRS. In other examples, the time measurement 704 may include a receive time of a received PRS, a time differential between transmit and receive times of a PRS, or other suitable time measurement information. In some examples, the time measurement 704 may include a respective time measurement 704 associated with each received PRS. The angle measurement 706 may include, for example, an angle of arrival of a received PRS (e.g., a PRS received by the UE sending the sidelink PI reporting SCI-2 700) and/or angle of departure of a transmitted PRS (e.g., PRS transmitted by the UE sending the sidelink PI reporting SCI-2 700). In some examples, the angle measurement 706 may include a respective angle measurement 706 (e.g., angle of arrival) for each received PRS.

The distance measurement 708 may include, for example, a calculated inter-UE distance. For example, the distance measurement 708 may include a distance between the UE sending the sidelink PI reporting SCI-2 700 and another UE calculated based on the received PRSs. In some examples, the distance measurement 708 may be quantized with a separately indicated (e.g., within the SCI-2 700) or configured (e.g., via RRC signaling) quantization level. For example, the quantization level may indicate the units of the distance measurement 708 and/or a scalar associated with the distance measurement 708. The direction indication 710 may indicate a direction to another UE. For example, the direction indication 710 may indicate a direction from the UE sending the sidelink PI reporting SCI-2 700 and the other UE. In some examples, the distance measurement 708 and/or direction indication 710 may include a respective distance measurement 708 and/or direction indication 710 for each participating UE.

The SCI-2 700 may further include a location 712 of the UE generating and transmitting the SCI-2 700, if known to the UE. Thus, the SCI-2 700 may include the location 712 in examples in which the sending UE has accurate knowledge of its position due to a previous GNSS-based positioning or based on the received PRSs from multiple UEs. The SCI-2 700 may further include a velocity and/or acceleration vector 714 associated with the UE generating and transmitting the SCI-2 700. For example, the velocity vector may indicate a current velocity of the sending UE, and the acceleration vector may indicate a current acceleration of the sending UE at the time of generation and transmission of the SCI-2 700. In some examples, the SCI-2 700 may further include a sidelink positioning establishment message 716 to establish another (a subsequent or new) sidelink positioning session. The sidelink positioning establishment message 716 may include, for example, one or more of the fields shown in FIG. 6.

Figure 8:
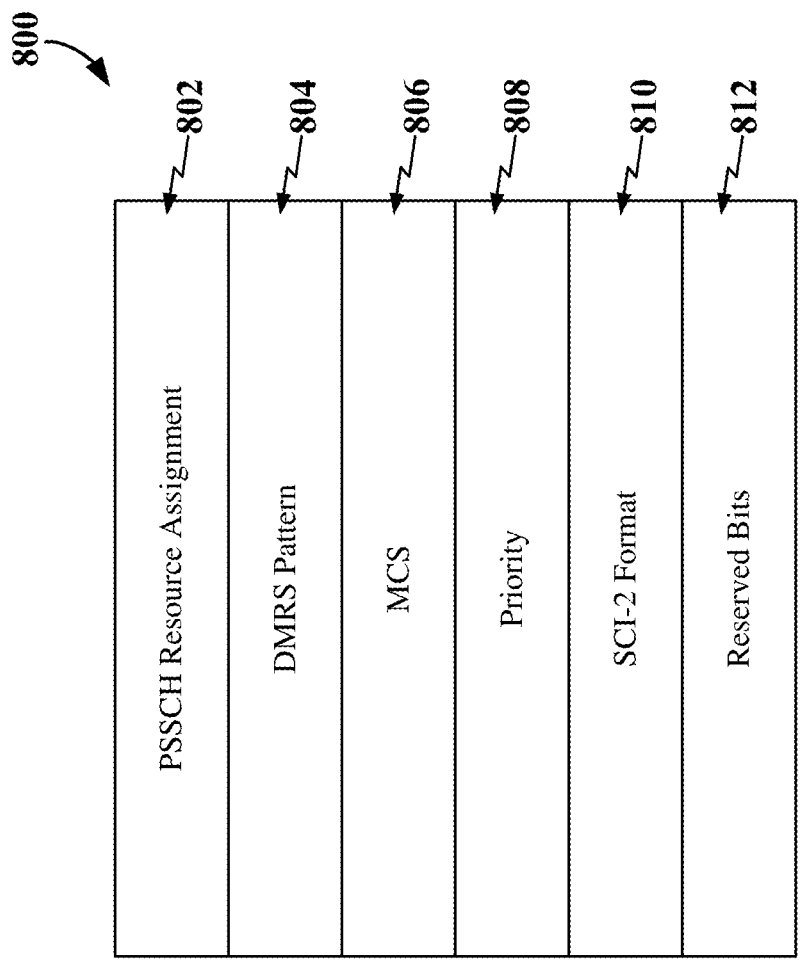
FIG. 8 is a diagram illustrating an example of SCI-1 indicating a format of SCI-2 for sidelink positioning according to some aspects.

FIG. 8 is a diagram illustrating an example of SCI-1 800 indicating a format of SCI-2 for sidelink positioning according to some aspects. The SCI-1 800 includes a plurality of fields and may be transmitted within a same slot as the SCI-2. For example, the SCI-1 800 may include a PSSCH resource assignment 802 indicating the resources (e.g., time-frequency resources) allocated for a PSSCH including the SCI-2. In some examples, the SCI-2 may be transmitted across all of the resources allocated in the PSSCH resource assignment 802. In other examples, the SCI-2 may be transmitted across a portion of the resources allocated in the PSSCH resource assignment 802. In this example, the remaining resources of the PSSCH assignment (e.g., the resources not utilized by the SCI-2) may not include data. Thus, the remaining resources may be unused (e.g., devoid of any transmission).

The SCI-1 800 may further include a DMRS pattern 804 (if more than one pattern is configured), a modulation and coding scheme (MCS) 806 of the PSSCH (e.g., the SCI-2), a priority 808 of the PSSCH (e.g., the SCI-2), an SCI-2 format 810 of the SCI-2, and up to four reserved bits 812. In some examples, the SCI-2 format 810 may include a dedicated SCI-2 format for sidelink positioning session establishment or sidelink PI reporting. In other examples, the SCI-2 format may include an existing SCI-2 format. In this example, one of the reserved bits 812 may correspond to a positioning indicator bit that indicates the SCI-2 is a sidelink positioning SCI-2 (e.g., SCI-2 600 or SCI-2 700). When a positioning indicator bit is set, a receiving UE may ignore the SCI-2 format indicated in the SCI-2 format field 810, and instead process the SCI-2 as a sidelink positioning SCI-2. In some examples, the sidelink positioning SCI-2 format(s) may be indicated via RRC signaling or pre-configured (e.g., factory settings based on 3GPP specifications related to sidelink positioning) on the UE. In some examples, the SCI-1 800 may include both the positioning indicator bit 812 and a dedicated sidelink positioning SCI-2 format 810 to indicate that the SCI-2 includes either the sidelink positioning session establishment message or sidelink PI reporting. Thus, in this example, the combination of the positioning indicator bit 812 and the SCI-2 format 810 indicate one of sidelink positioning establishment or sidelink PI.

Figure 9:
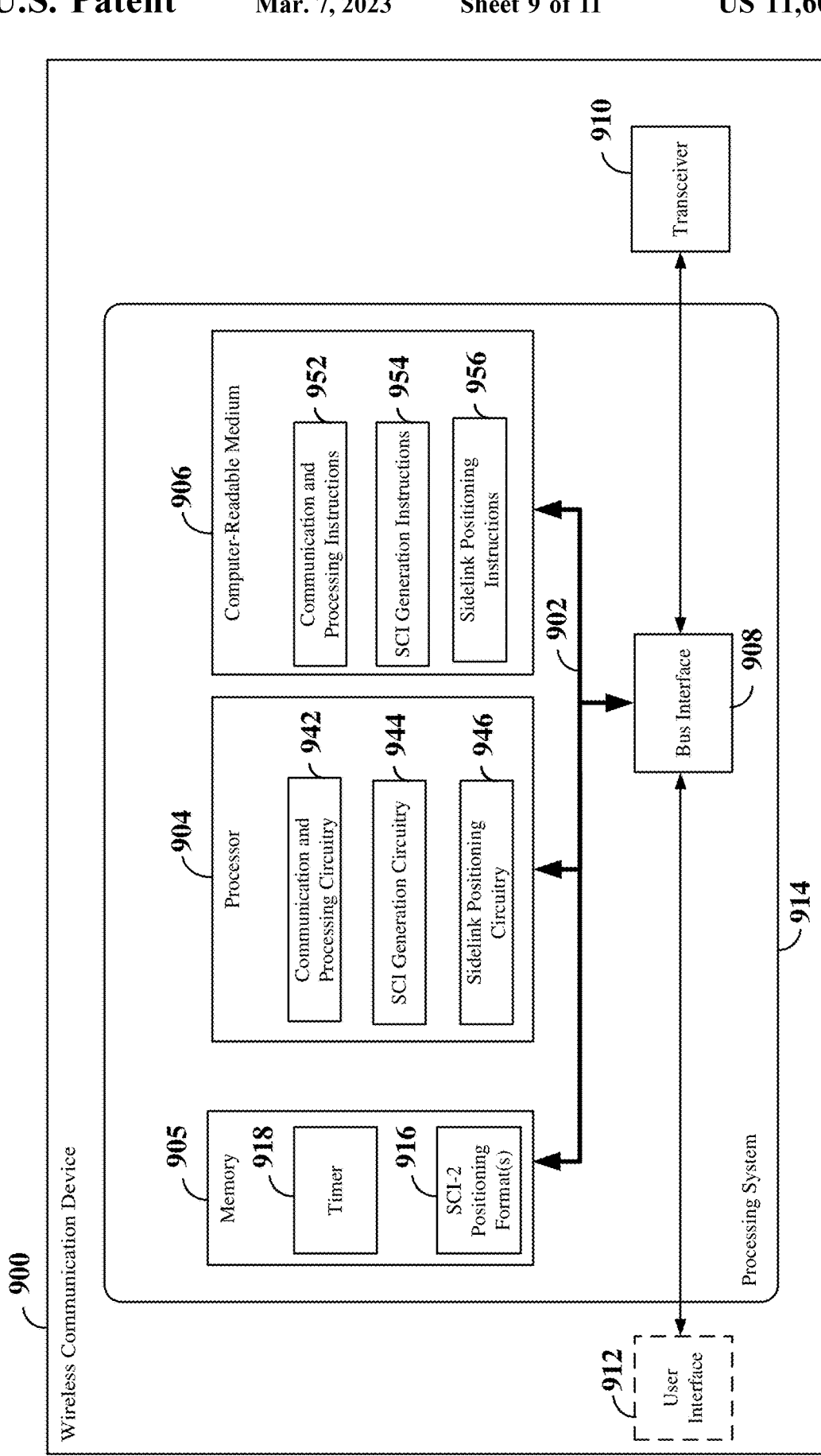
FIG. 9 is a block diagram illustrating an example of a hardware implementation for a wireless communication device employing a processing system according to some aspects.

FIG. 9 is a block diagram illustrating an example of a hardware implementation for a wireless communication device 900 employing a processing system 914. For example, the wireless communication device 900 may correspond to a sidelink device, such as a V2X device, D2D device or other UE or wireless communication device configured for sidelink or D2D communication, as shown and described above in reference to FIGS. 1, 3, and/or 5.

The wireless communication device 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 900 may be configured to perform any one or more of the functions described herein. That is, the processor 904, as utilized in the wireless communication device 900, may be used to implement any one or more of the processes and procedures described below.

The processor 904 may in some instances be implemented via a baseband or modem chip and in other implementations, the processor 904 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 914 may be implemented with a bus architecture, represented generally by the bus 902. The bus 902 may include any number of interconnecting buses and bridges depending on the specific application of the processing system 914 and the overall design constraints. The bus 902 links together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further.

A bus interface 908 provides an interface between the bus 902 and a transceiver 910. The transceiver 910 provides a communication interface or a means for communicating with various other apparatus over a transmission medium (e.g., air interface). Depending upon the nature of the apparatus, a user interface 912 (e.g., keypad, display, touch screen, speaker, microphone, control knobs, etc.) may also be provided. Of course, such a user interface 912 is optional, and may be omitted in some examples.

The processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software. For example, the memory 905 may store SCI-2 format(s) 916 and a timer 918 used by the processor 904 in sidelink positioning.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906.

The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. In some examples, the computer-readable medium 906 may be part of the memory 905. Those skilled in the art will recognize how best to implement the described functionality presented throughout this disclosure depending on the particular application and the overall design constraints imposed on the overall system.

In some aspects of the disclosure, the processor 904 may include circuitry configured for various functions. For example, the processor 904 may include communication and processing circuitry 942, configured to communicate with one or more sidelink devices (e.g., other UEs) via respective sidelinks (e.g., PC5 interfaces). In addition, the communication and processing circuitry 942 may be configured to communicate with a base station (e.g., gNB or eNB) via a Uu link. In some examples, the communication and processing circuitry 942 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 942 may include one or more transmit/receive chains.

In some implementations where the communication involves receiving information, the communication and processing circuitry 942 may obtain information from a component of the wireless communication device 900 (e.g., from the transceiver 910 that receives the information via radio frequency signaling or some other type of signaling suitable for the applicable communication medium), process (e.g., decode) the information, and output the processed information. For example, the communication and processing circuitry 942 may output the information to another component of the processor 904, to the memory 905, or to the bus interface 908. In some examples, the communication and processing circuitry 942 may receive one or more of signals, messages, other information, or any combination thereof. In some examples, the communication and processing circuitry 942 may receive information via one or more channels. In some examples, the communication and processing circuitry 942 may include functionality for a means for receiving. In some examples, the communication and processing circuitry 942 may include functionality for a means for processing, including a means for demodulating, a means for decoding, etc.

In some implementations where the communication involves sending (e.g., transmitting) information, the communication and processing circuitry 942 may obtain information (e.g., from another component of the processor 904, the memory 905, or the bus interface 908), process (e.g., modulate, encode, etc.) the information, and output the processed information. For example, the communication and processing circuitry 942 may output the information to the transceiver 910 (e.g., that transmits the information via radio frequency signaling or some other type of signaling suitable for the applicable communication medium). In some examples, the communication and processing circuitry 942 may send one or more of signals, messages, other information, or any combination thereof. In some examples, the communication and processing circuitry 942 may send information via one or more channels. In some examples, the communication and processing circuitry 942 may include functionality for a means for sending (e.g., a means for transmitting). In some examples, the communication and processing circuitry 942 may include functionality for a means for generating, including a means for modulating, a means for encoding, etc.

In some examples, the communication and processing circuitry 942 may be configured to transmit SCI-2 including a sidelink positioning establishment message to establish a sidelink positioning session (e.g., a sidelink ranging session) with at least a second wireless communication device. The communication and processing circuitry 942 may further be configured to receive a SCI-2 including a sidelink positioning establishment message from a second wireless communication device to establish a sidelink positioning session with at least the second wireless communication device.

In some examples, the communication and processing circuitry 942 may further be configured to communicate one or more sidelink positioning reference signals (PRSs) with at least the second wireless communication device during the sidelink positioning session. For example, the communication and processing circuitry 942 may be configured to transmit PRSs to at least the second wireless communication device and to receive PRSs from at least the second wireless communication device.

In some examples, the communication and processing circuitry 942 may be configured to receive sidelink positioning information based on the one or more PRSs from at least the second wireless communication device. In addition, the communication and processing circuitry 942 may be configured to transmit sidelink positioning information based on the one or more PRSs to at least the second wireless communication device. The communication and processing circuitry 942 may further be configured to execute communication and processing instructions (software) 952 stored in the computer-readable medium 906 to implement one or more of the functions described herein.

The processor 904 may further include SCI generation circuitry 944, configured to generate SCI-2 including a sidelink positioning session establishment message. The sidelink positioning session establishment SCI-2 may have an SCI-2 format 916 selected from a plurality of SCI-2 formats 916 maintained, for example, in memory 905. The SCI-2 formats may be configured via RRC signaling or pre-configured in the memory 905 by the original equipment manufacturer (OEM) based on 3GPP sidelink positioning specifications. For example, the SCI-2 format 916 may be a dedicated SCI-2 format for sidelink positioning session establishment or may be a modified SCI-2 format.

The SCI generation circuitry 944 may be configured, for example, to include one or more destination identifiers (IDs) in the sidelink positioning session establishment SCI-2. For example, the destination ID(s) may include a single destination ID of the second wireless communication device for unicast transmission of the SCI-2 to the second wireless communication device. The destination ID(s) may also include a plurality of destination IDs, each associated with a participating (target) wireless communication device, including the second wireless communication device, for unicast transmission of the SCI-2 to the participating wireless communication devices. The destination ID(s) may also include a group ID for groupcast communication of the SCI-2 to a group of participating wireless communication devices, or a broadcast ID for broadcast communication of the SCI-2 to wireless communication devices within range of the transmitting (initiating) wireless communication device 900.

The SCI generation circuitry 944 may further be configured to include location information associated with the wireless communication device 900 in the sidelink positioning session establishment SCI-2. The location information may include, for example, a zone identifier (ID) of a zone having a zone size (e.g., an area) within which the wireless communication device 900 is located. The SCI generation circuitry 944 may further be configured to include a range in the sidelink positioning session establishment SCI-2. The range may be associated with the location information and identify an area for the sidelink positioning session.

The SCI generation circuitry 944 may further be configured to include a time duration of the sidelink positioning session in the sidelink positioning session establishment SCI-2. The SCI generation circuitry 944 may further be configured to include a periodicity of the sidelink positioning session in the sidelink positioning session establishment SCI-2. In addition, the SCI generation circuitry 944 may further be configured to include resource information for the one or more PRSs in the sidelink positioning session establishment SCI-2.

The SCI generation circuitry 944 may further be configured to generate additional SCI-2 including sidelink positioning information. The sidelink positioning information reporting SCI-2 may have an SCI-2 format 916 selected from a plurality of SCI-2 formats 916 maintained, for example, in memory 905. The SCI-2 formats may be configured via RRC signaling or pre-configured in the memory 905 by the original equipment manufacturer (OEM) based on 3GPP sidelink positioning specifications. For example, the SCI-2 format 916 may be a dedicated SCI-2 format for sidelink positioning information reporting or may be a modified SCI-2 format.

The SCI generation circuitry 944 may be configured, for example, to include one or more destination identifiers (IDs) in the sidelink positioning information reporting SCI-2. The SCI generation circuitry 944 may further be configured to include the sidelink positioning information in the SCI-2. The sidelink positioning information may include, for example, at least one of a time measurement, an angle measurement, a distance measurement, or a direction indication. The sidelink positioning information may further include a location, velocity vector, and/or acceleration vector of the wireless communication device 900. In some examples, the SCI generation circuitry 944 may further be configured to include an additional sidelink positioning establishment message in the sidelink positioning information reporting SCI-2. The additional sidelink positioning establishment message may be configured to establish an additional sidelink positioning session, and may have a format similar to the sidelink positioning session establishment SCI-2.

The SCI generation circuitry 944 may further be configured to generate SCI-1 including an indication that the SCI-2 includes a sidelink positioning establishment message or sidelink positioning information. In some examples, the indication may include a positioning indicator bit or an SCI-2 format field. For example, the SCI-2 format field may include an identifier of a dedicated SCI-2 format for sidelink positioning session establishment or sidelink positioning information reporting. In other examples, the SCI-2 format may include an existing SCI-2 format. In this example, the SCI-1 may include a positioning indicator bit that indicates the SCI-2 is a sidelink positioning SCI-2 (e.g., SCI-2 600 or SCI-2 700). When a positioning indicator bit is set, a receiving UE may ignore the SCI-2 format indicated in the SCI-1, and instead process the SCI-2 as a sidelink positioning SCI-2. The SCI generation circuitry 944 may further be configured to execute SCI generation instructions (software) 954 stored in the computer-readable medium 906 to implement one or more of the functions described herein.

The processor 904 may further include sidelink positioning circuitry 946, configured to establish a sidelink positioning session, transmit and receive sidelink PRSs during the sidelink positioning session, and to transmit and receive sidelink positioning information based on the PRSs during the sidelink positioning session. For example, the sidelink positioning circuitry 946 may be configured to facilitate a three-way handshake with at least the second wireless communication device to establish the sidelink positioning session. In examples in which the wireless communication device 900 is an initiating wireless communication device, the sidelink positioning circuitry 946 may be configured to operate together with the SCI generation circuitry 944 and communication and processing circuitry 942 to generate and transmit the SCI-2 including the sidelink positioning establishment message to trigger the sidelink positioning session. In examples in which the wireless communication device is a target wireless communication device, the sidelink positioning circuitry 946 may be configured to operate together with the communication and processing circuitry 942 to receive the SCI-2 including the sidelink positioning establishment message.

In examples in which the SCI-2 including the sidelink positioning establishment message includes a time duration of the sidelink positioning session, the sidelink positioning circuitry 946 may further be configured to set (initiate) a timer 918 maintained, for example, in memory 905 with the time duration of the sidelink positioning session. Upon expiration of the timer 918, the sidelink positioning circuitry 946 may end the sidelink positioning session (e.g., not transmit or receive any additional PRSs and/or sidelink positioning information). The timer 918 may be set on each participating wireless communication device (including the initiating wireless communication device).

In addition, the sidelink positioning circuitry 946 may be configured to calculate the relative position or absolute position (e.g., geographical coordinates) of the wireless communication device 900. In examples in which the wireless communication device 900 has zero or inaccurate knowledge of its position, the positioning information received from other wireless communication devices may be utilized to yield a respective range between the wireless communication device 900 and each other participating wireless communication device. In examples in which wireless communication device 900 has accurate knowledge of its position (e.g., based on a GNSS-based positioning or receipt of multiple sidelink positioning information SCI-2 from multiple participating wireless communication devices), the positioning information received from other wireless communication devices may be utilized to yield an absolute position of the wireless communication device 900. The sidelink positioning circuitry 946 may further be configured to execute sidelink positioning instructions (software) 956 stored in the computer-readable medium 906 to implement one or more of the functions described herein.

Figure 10:
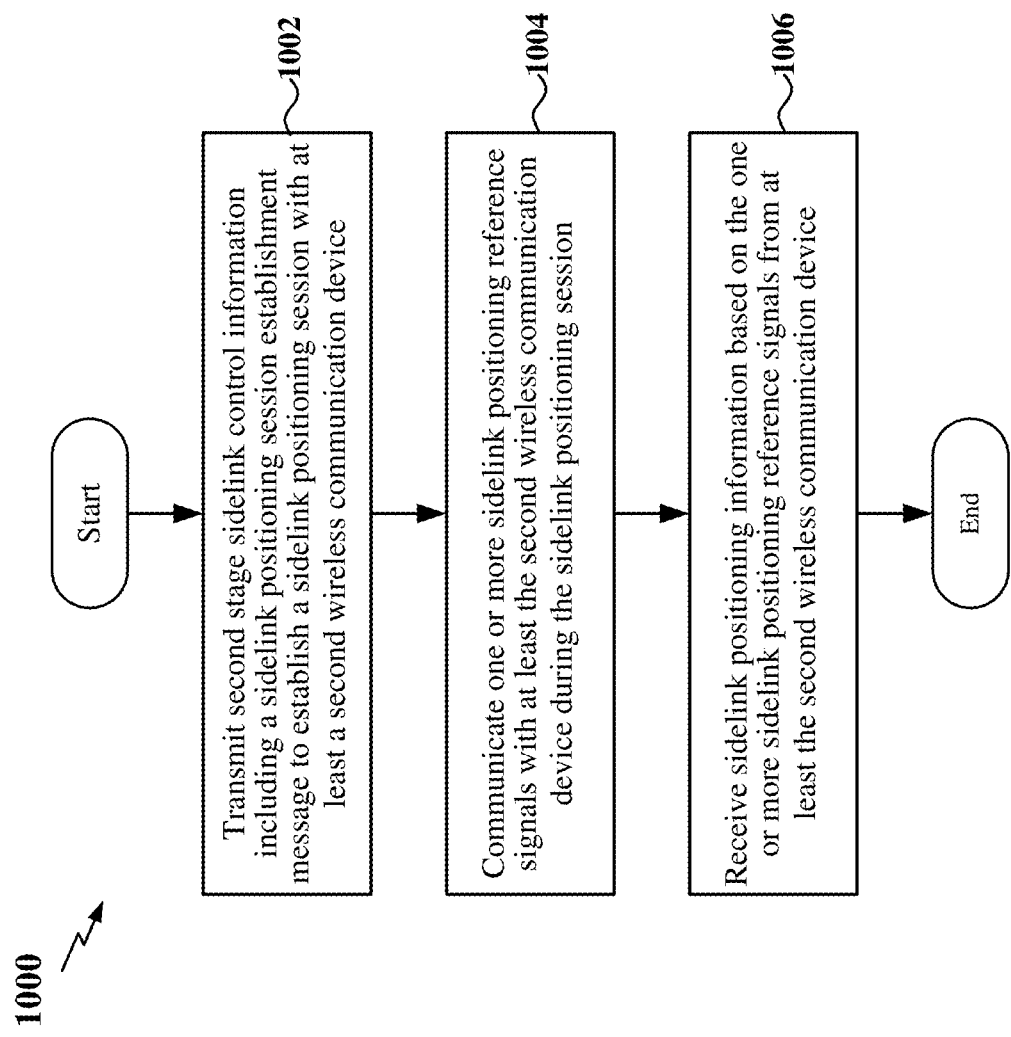
FIG. 10 is a flow chart of an exemplary method for sidelink positioning according to some aspects.

FIG. 10 is a flow chart 1000 of an exemplary method for sidelink positioning according to some aspects. As described below, some or all illustrated features may be omitted in a particular implementation within the scope of the present disclosure, and some illustrated features may not be required for implementation of all examples. In some examples, the method may be performed by the wireless communication device 900, as described above and illustrated in FIG. 9, by a processor or processing system, or by any suitable means for carrying out the described functions.

At block 1002, the wireless communication device (e.g., a first wireless communication device configured for sidelink communication) may transmit second stage sidelink control information (SCI-2) including a sidelink positioning session establishment message to establish a sidelink positioning session with at least a second wireless communication device. In some examples, the sidelink positioning session establishment message can include a destination identifier (ID) associated with at least the second wireless communication device. For example, the destination ID can include a plurality of destination IDs, each associated with one of a plurality of participating wireless communication devices including the second wireless communication device, a group ID of a group of participating wireless communication devices including the second wireless communication device, or a broadcast ID.

In some examples, the sidelink positioning establishment message can include a zone identifier (ID) of a zone including an area within which the first wireless communication device is located. In some examples, the sidelink positioning establishment message can include a range associated with the location information that identifies an area for the sidelink positioning session. The second wireless communication device can be within the area.

In some examples, the sidelink positioning session establishment message can include a time duration of the sidelink positioning session. In some examples, the sidelink positioning establishment message can further include a periodicity of the sidelink positioning session. In some examples, the sidelink positioning session establishment message can include resource information for the one or more positioning reference signals.

In some examples, the first wireless communication device can further transmit first stage SCI (SCI-1) including an indication that the SCI-2 includes the sidelink positioning session establishment message. For example, the indication can include at least one of a positioning indicator bit or a dedicated SCI-2 format. For example, the communication and processing circuitry 942, SCI generation circuitry 944, sidelink positioning circuitry 946, and transceiver 910, shown and described above in connection with FIG. 9, may provide a means to generate and transmit SCI-2 including a sidelink positioning establishment message to establish a sidelink positioning session.

At block 1004, the first wireless communication device may communicate one or more sidelink positioning reference signals with at least the second wireless communication device during the sidelink positioning session. For example, the first wireless communication device may transmit and/or receive one or more PRSs during the sidelink positioning session. For example, the communication and processing circuitry 942, sidelink positioning circuitry 946, and transceiver 910, shown and described above in connection with FIG. 9 may provide a means to communicate one or more PRSs during the sidelink positioning session.

At block 1006, the first wireless communication device may receive sidelink positioning information based on the one or more sidelink positioning reference signals from at least the second wireless communication device. In some examples, the first wireless communication device may receive an additional SCI-2 including the sidelink positioning reference information. In this example, the first wireless communication device may further receive first stage SCI (SCI-1) including an indication that the additional SCI-2 includes the sidelink positioning information.

In some examples, the sidelink positioning information can include one of a time measurement, an angle measurement, a distance measurement, or a direction indication. In some examples, the sidelink positioning information can include at least one of a location, a velocity vector, or an acceleration vector of the second wireless communication device. In some examples, the sidelink positioning information can further include an additional sidelink positioning establishment message to establish an additional sidelink positioning session.

In some examples, the first wireless communication device can further transmit additional sidelink positioning information based on the one or more positioning reference signals to at least the second wireless communication device. For example, the additional sidelink positioning information may be transmitted within additional SCI-2. For example, the communication and processing circuitry 942, SCI generation circuitry 944, sidelink positioning circuitry 946, and transceiver 910 shown and described above in connection with FIG. 9 may provide a means to receive sidelink positioning information.

In one configuration, the wireless communication device 900 includes means for transmitting second stage sidelink control information comprising a sidelink positioning session establishment message to establish a sidelink positioning session with at least a second wireless communication device, as described in the present disclosure. The wireless communication device 900 further includes means for communicating one or more sidelink positioning reference signals with at least the second wireless communication device during the sidelink positioning session and means for receiving sidelink positioning information based on the one or more sidelink positioning reference signals from at least the second wireless communication device, as described in the present disclosure. In one aspect, the aforementioned means may be the processor 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1, 3, and/or 5, and utilizing, for example, the processes and/or algorithms described herein in relation to FIGS. 5 and 10.

Figure 11:
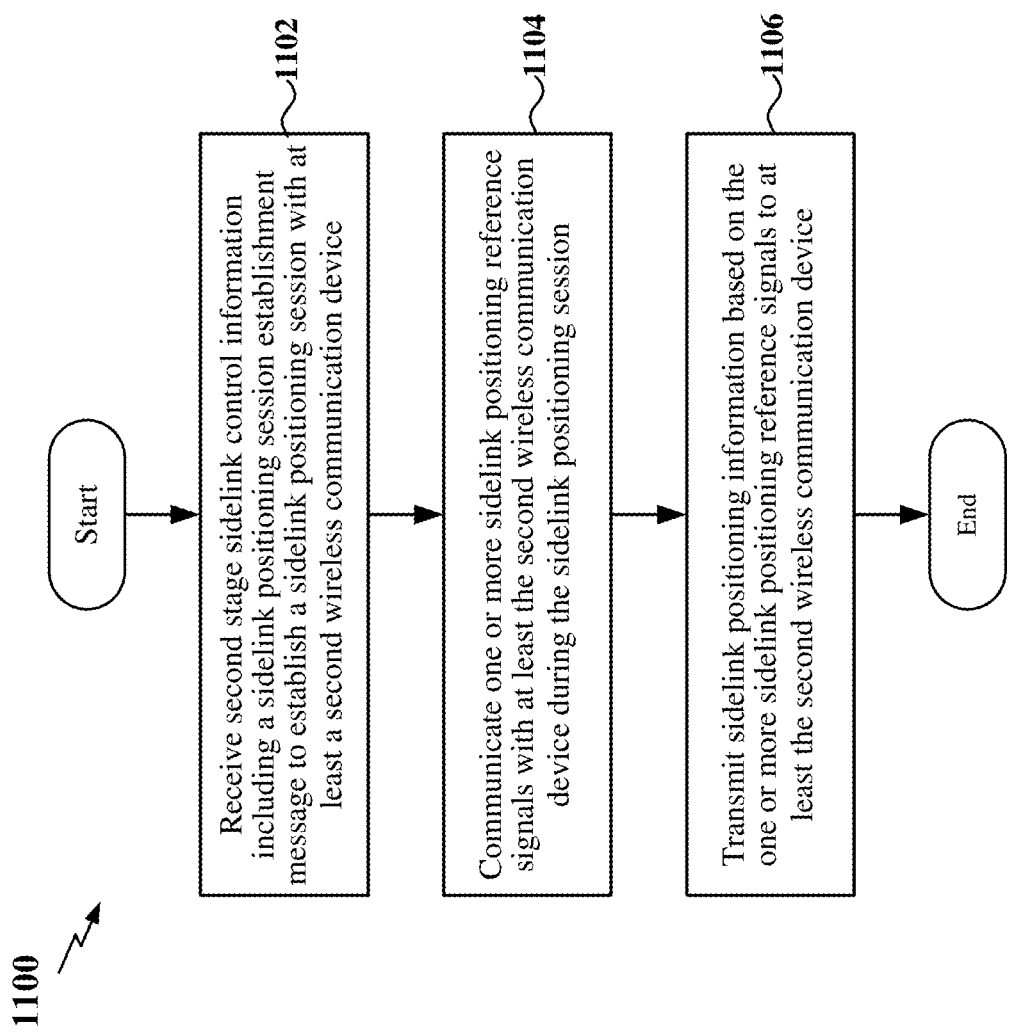
FIG. 11 is a flow chart of another exemplary method for sidelink positioning according to some aspects.

FIG. 11 is a flow chart 1100 of another exemplary method for sidelink positioning according to some aspects. As described below, some or all illustrated features may be omitted in a particular implementation within the scope of the present disclosure, and some illustrated features may not be required for implementation of all examples. In some examples, the method may be performed by the wireless communication device 900, as described above and illustrated in FIG. 9, by a processor or processing system, or by any suitable means for carrying out the described functions.

At block 1102, the wireless communication device (e.g., a first wireless communication device configured for sidelink communication) may receive second stage sidelink control information (SCI-2) including a sidelink positioning session establishment message to establish a sidelink positioning session with at least a second wireless communication device. In some examples, the sidelink positioning session establishment message can include a destination identifier (ID) associated with at least the second wireless communication device. For example, the destination ID can include a plurality of destination IDs, each associated with one of a plurality of participating wireless communication devices including the second wireless communication device, a group ID of a group of participating wireless communication devices including the second wireless communication device, or a broadcast ID.

In some examples, the sidelink positioning establishment message can include a zone identifier (ID) of a zone including an area within which the first wireless communication device is located. In some examples, the sidelink positioning establishment message can include a range associated with the location information that identifies an area for the sidelink positioning session. The second wireless communication device can be within the area.

In some examples, the sidelink positioning session establishment message can include a time duration of the sidelink positioning session. In this example, the first wireless communication device can further set a timer based on the time duration for the sidelink positioning session. In some examples, the sidelink positioning establishment message can further include a periodicity of the sidelink positioning session. In some examples, the sidelink positioning session establishment message can include resource information for the one or more positioning reference signals.

In some examples, the first wireless communication device can further receive first stage SCI (SCI-1) including an indication that the SCI-2 includes the sidelink positioning session establishment message. For example, the indication can include at least one of a positioning indicator bit or a dedicated SCI-2 format. For example, the communication and processing circuitry 942, SCI generation circuitry 944, sidelink positioning circuitry 946, and transceiver 910, shown and described above in connection with FIG. 9, may provide a means to receive SCI-2 including a sidelink positioning establishment message to establish a sidelink positioning session.

At block 1104, the first wireless communication device may communicate one or more sidelink positioning reference signals with at least the second wireless communication device during the sidelink positioning session. For example, the first wireless communication device may transmit and/or receive one or more PRSs during the sidelink positioning session. For example, the communication and processing circuitry 942, sidelink positioning circuitry 946, and transceiver 910, shown and described above in connection with FIG. 9 may provide a means to communicate one or more PRSs during the sidelink positioning session.

At block 1106, the first wireless communication device may transmit sidelink positioning information based on the one or more sidelink positioning reference signals to at least the second wireless communication device. In some examples, the first wireless communication device may transmit an additional SCI-2 including the sidelink positioning reference information. In this example, the first wireless communication device may further transmit first stage SCI (SCI-1) including an indication that the additional SCI-2 includes the sidelink positioning information.

In some examples, the sidelink positioning information can include one of a time measurement, an angle measurement, a distance measurement, or a direction indication. In some examples, the sidelink positioning information can include at least one of a location, a velocity vector, or an acceleration vector of the first wireless communication device. In some examples, the sidelink positioning information can further include an additional sidelink positioning establishment message to establish an additional sidelink positioning session.

In some examples, the first wireless communication device can further receive additional sidelink positioning information based on the one or more positioning reference signals from at least the second wireless communication device. For example, the additional sidelink positioning information may be received within additional SCI-2. For example, the communication and processing circuitry 942, SCI generation circuitry 944, sidelink positioning circuitry 946, and transceiver 910 shown and described above in connection with FIG. 9 may provide a means to transmit sidelink positioning information.

In one configuration, the wireless communication device 900 includes means for receiving second stage sidelink control information comprising a sidelink positioning session establishment message to establish a sidelink positioning session with at least a second wireless communication device, as described in the present disclosure. The wireless communication device 900 further includes means for communicating one or more sidelink positioning reference signals with at least the second wireless communication device during the sidelink positioning session and means for transmitting sidelink positioning information based on the one or more sidelink positioning reference signals from at least the second wireless communication device, as described in the present disclosure. In one aspect, the aforementioned means may be the processor 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS.

1, 3, and/or 5, and utilizing, for example, the processes and/or algorithms described herein in relation to FIGS. 5 and 11.

The processes shown in FIGS. 10-11 may include additional aspects, such as any single aspect or any combination of aspects described below and/or in connection with one or more other processes described elsewhere herein.

Aspect 1: A method for sidelink positioning at a first wireless communication device in a wireless communication network, the method comprising: transmitting second stage sidelink control information comprising a sidelink positioning session establishment message to establish a sidelink positioning session with at least a second wireless communication device; communicating one or more sidelink positioning reference signals with at least the second wireless communication device during the sidelink positioning session; and receiving sidelink positioning information based on the one or more sidelink positioning reference signals from at least the second wireless communication device.

Aspect 2: The method of aspect 1, wherein the sidelink positioning session establishment message comprises a destination identifier (ID) associated with at least the second wireless communication device.

Aspect 3: The method of aspect 2, wherein the destination ID comprises a plurality of destination IDs, each associated with one of a plurality of participating wireless communication devices including the second wireless communication device, a group ID of a group of participating wireless communication devices including the second wireless communication device, or a broadcast ID.

Aspect 4: The method of any of aspects 1 through 3, wherein the sidelink positioning establishment message further comprises location information associated with the first wireless communication device.

Aspect 5: The method of aspect 4, wherein the location information comprises a zone identifier (ID) of a zone comprising an area within which the first wireless communication device is located.

Aspect 6: The method of aspect 4, wherein the sidelink positioning establishment message comprises a range associated with the location information that identifies an area for the sidelink positioning session, wherein the second wireless communication device is within the area.

Aspect 7: The method of any of aspects 1 through 6, wherein the sidelink positioning establishment message comprises a time duration of the sidelink positioning session.

Aspect 8: The method of aspect 7, wherein the sidelink positioning establishment message further comprises a periodicity of the sidelink positioning session.

Aspect 9: The method of any of aspects 1 through 8, wherein the sidelink positioning session establishment message comprises resource information for the positioning reference signal.

Aspect 10: The method of any of aspects 1 through 9, further comprising: transmitting first stage SCI (SCI-1) comprising an indication that the SCI-2 comprises the sidelink positioning session establishment message.

Aspect 11: The method of aspect 10, wherein the indication comprises at least one of a single indication bit or a SCI-2 format field.

Aspect 12: The method of any of aspects 1 through 11, wherein the receiving the sidelink positioning information further comprises: receiving the sidelink positioning reference information with an additional SCI-2; and receiving first stage SCI (SCI-1) comprising an indication that the additional SCI-2 comprises the sidelink positioning information.

Aspect 13: The method of any of aspects 1 through 12, wherein the sidelink positioning information comprises at least one of a time measurement, an angle measurement, a distance measurement, a direction indication, or a location.

Aspect 14: The method of aspect 13, wherein the sidelink positioning information is received from the second wireless communication device and further comprises at least one of an identifier of the second wireless communication device or at least one of a velocity or acceleration vector of the second wireless communication device.

Aspect 15: The method of any of aspects 1 through 14, wherein the sidelink positioning information further comprises an additional sidelink positioning session establishment message to establish an additional sidelink positioning session.

Aspect 16: The method of any of aspects 1 through 15, further comprising: transmitting additional sidelink positioning information based on the one or more positioning reference signals to at least the second wireless communication device.

Aspect 17: A method for sidelink positioning at a first wireless communication device in a wireless communication network, the method comprising: receiving second stage sidelink control information comprising a sidelink positioning session establishment message to establish a sidelink positioning session with at least a second wireless communication device; communicate one or more sidelink positioning reference signals with at least the second wireless communication device during the sidelink positioning session; and transmit sidelink positioning information based on the one or more sidelink positioning reference signals to at least the second wireless communication device.

Aspect 18: The method of aspect 17, wherein the sidelink positioning session establishment message further comprises location information associated with the first wireless communication device and a range associated with the location information that identifies an area for the sidelink positioning session, wherein the second wireless communication device is within the area.

Aspect 19: The method of aspects 17 or 18, wherein the sidelink positioning session establishment message comprises a time duration of the sidelink positioning session.

Aspect 20: The method of aspect 19, further comprising: setting a timer based on the time duration for the sidelink positioning session.

Aspect 21: The method of any of aspects 17 through 20, further comprising: receiving first stage SCI (SCI-1) comprising an indication that the SCI-2 comprises the sidelink positioning session establishment message.

Aspect 22: The method of any of aspects 17 through 21, wherein the transmitting the sidelink positioning information further comprises: transmitting an additional SCI-2 comprising the sidelink positioning information; and transmitting first stage SCI (SCI-1) comprising an indication that the additional SCI-2 comprises the sidelink positioning information.

Aspect 23: The method of any of aspects 17 through 22, wherein the sidelink positioning information comprises at least one of a time measurement, an angle measurement, a distance measurement, or a direction indication.

Aspect 24: The method of aspect 23, wherein the sidelink positioning information further comprises at least one of a location, velocity vector, or acceleration vector of the first wireless communication device.

Aspect 25: The method of any of aspects 17 through 24, further comprising: transmitting additional sidelink positioning information based on the one or more positioning reference signals to at least the second wireless communication device.

Aspect 26: A first wireless communication device in a wireless communication network comprising a transceiver, a memory, and a processor coupled to the transceiver and the memory, the processor and the memory configured to perform a method of any one of examples 1 through 16 or 17 through 25.

Aspect 27: An apparatus configured for wireless communication comprising means for performing a method of any one of examples 1 through 16 or 17 through 25.

Aspect 28: A non-transitory computer-readable medium having stored therein instructions executable by one or more processors of a first wireless communication device in a wireless communication network to perform a method of any one of examples 1 through 16 or 17 through 25.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3, 5, and/or 9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first wireless communication device in a wireless communication network, comprising:
    a transceiver,
    a memory; and
    a processor coupled to the transceiver and the memory, wherein the processor and the memory are configured to:
        transmit second stage sidelink control information (SCI-2) comprising a sidelink positioning session establishment message via the transceiver to establish a sidelink positioning session with at least a second wireless communication device;
        communicate one or more sidelink positioning reference signals with at least the second wireless communication device during the sidelink positioning session via the transceiver, and
        receive sidelink positioning information based on the one or more sidelink positioning reference signals from at least the second wireless communication device via the transceiver.

2. The first wireless communication device of claim 1, wherein the sidelink positioning session establishment message comprises a destination identifier (ID) associated with at least the second wireless communication device.

3. The first wireless communication device of claim 2, wherein the destination ID comprises a plurality of destination IDs, each associated with one of a plurality of participating wireless communication devices including the second wireless communication device, a group ID of a group of participating wireless communication devices including the second wireless communication device, or a broadcast ID.

4. The first wireless communication device of claim 1, wherein the sidelink positioning session establishment message further comprises location information associated with the first wireless communication device.

5. The first wireless communication device of claim 4, wherein the location information comprises a zone identifier (ID) of a zone comprising an area within which the first wireless communication device is located.

6. The first wireless communication device of claim 4, wherein the sidelink positioning session establishment message comprises a range associated with the location information that identifies an area for the sidelink positioning session, wherein the second wireless communication device is within the area.

7. The first wireless communication device of claim 1, wherein the sidelink positioning session establishment message comprises a time duration of the sidelink positioning session.

8. The first wireless communication device of claim 7, wherein the sidelink positioning session establishment message further comprises a periodicity of the sidelink positioning session.

9. The first wireless communication device of claim 1, wherein the sidelink positioning session establishment message comprises resource information for the one or more positioning reference signals.

10. The first wireless communication device of claim 1, wherein the processor and the memory are further configured to:
    transmit first stage SCI (SCI-1) comprising an indication that the SCI-2 comprises the sidelink positioning session establishment message.

11. The first wireless communication device of claim 10, wherein the indication comprises at least one of a positioning indicator bit or a dedicated SCI-2 format for the sidelink positioning session establishment message.

12. The first wireless communication device of claim 1, wherein the processor and the memory are further configured to:
    receive an additional SCI-2 comprising the sidelink positioning information; and
    receive first stage SCI (SCI-1) comprising an indication that the additional SCI-2 comprises the sidelink positioning information.

13. The first wireless communication device of claim 1, wherein the sidelink positioning information comprises at least one of a time measurement, an angle measurement, a distance measurement, or a direction indication.

14. The first wireless communication device of claim 13, wherein the sidelink positioning information further comprises at least one of a location, velocity vector, or acceleration vector of the second wireless communication device.

15. The first wireless communication device of claim 1, wherein the sidelink positioning information further comprises an additional sidelink positioning session establishment message to establish an additional sidelink positioning session.

16. The first wireless communication device of claim 1, wherein the processor and the memory are further configured to:

transmit additional sidelink positioning information based on the one or more positioning reference signals to at least the second wireless communication device.

17. A method for sidelink positioning at a first wireless communication device in a wireless communication network, the method comprising:
   transmitting second stage sidelink control information (SCI-2) comprising a sidelink positioning session establishment message to establish a sidelink positioning session with at least a second wireless communication device;
   communicating one or more sidelink positioning reference signals with at least the second wireless communication device during the sidelink positioning session; and
   receiving sidelink positioning information based on the one or more sidelink positioning reference signals from at least the second wireless communication device.

18. The method of claim 17, further comprising:
   transmitting first stage SCI (SCI-1) comprising an indication that the SCI-2 comprises the sidelink positioning session establishment message.

19. The method of claim 17, wherein the receiving the sidelink positioning information further comprises:
   receiving an additional SCI-2 comprising the sidelink positioning information; and
   receiving first stage SCI (SCI-1) comprising an indication that the additional SCI-2 comprises the sidelink positioning information.

20. A first wireless communication device in a wireless communication network, comprising:
   a transceiver,
   a memory; and
   a processor coupled to the transceiver and the memory, wherein the processor and the memory are configured to:
      receive second stage sidelink control information (SCI-2) comprising a sidelink positioning session establishment message via the transceiver to establish a sidelink positioning session with at least a second wireless communication device;
      communicate one or more sidelink positioning reference signals with at least the second wireless communication device during the sidelink positioning session via the transceiver, and
      transmit sidelink positioning information based on the one or more sidelink positioning reference signals to at least the second wireless communication device via the transceiver.

21. The first wireless communication device of claim 1, wherein the sidelink positioning session establishment message further comprises location information associated with the first wireless communication device and a range associated with the location information that identifies an area for the sidelink positioning session, wherein the second wireless communication device is within the area.

22. The first wireless communication device of claim 1, wherein the sidelink positioning session establishment message comprises a time duration of the sidelink positioning session.

23. The first wireless communication device of claim 22, wherein the processor and the memory are further configured to:
   set a timer based on the time duration for the sidelink positioning session.

24. The first wireless communication device of claim 20, wherein the processor and the memory are further configured to:
   receive first stage SCI (SCI-1) comprising an indication that the SCI-2 comprises the sidelink positioning session establishment message.

25. The first wireless communication device of claim 20, wherein the processor and the memory are further configured to:
   transmit an additional SCI-2 comprising the sidelink positioning information; and
   transmit first stage SCI (SCI-1) comprising an indication that the additional SCI-2 comprises the sidelink positioning information.

26. The first wireless communication device of claim 20, wherein the sidelink positioning information comprises at least one of a time measurement, an angle measurement, a distance measurement, or a direction indication.

27. The first wireless communication device of claim 26, wherein the sidelink positioning information further comprises at least one of a location, velocity vector, or acceleration vector of the first wireless communication device.

28. The first wireless communication device of claim 20, wherein the processor and the memory are further configured to:
   transmit additional sidelink positioning information based on the one or more sidelink positioning reference signals to at least the second wireless communication device.

29. A method for sidelink positioning at a first wireless communication device in a wireless communication network, the method comprising:
   receiving second stage sidelink control information (SCI-2) comprising a sidelink positioning session establishment message to establish a sidelink positioning session with at least a second wireless communication device;
   communicating one or more sidelink positioning reference signals with at least the second wireless communication device during the sidelink positioning session; and
   transmitting sidelink positioning information based on the one or more sidelink positioning reference signals to at least the second wireless communication device.

30. The method of claim 29, wherein the transmitting the sidelink positioning information further comprises:
   transmitting an additional SCI-2 comprising the sidelink positioning information; and
   transmitting first stage SCI (SCI-1) comprising an indication that the additional SCI-2 comprises the sidelink positioning information.

* * * * *